United States Patent [19]

Frederick et al.

[11] 4,314,602
[45] Feb. 9, 1982

[54] KNOCK-DOWN HEAT STORAGE TANK

[75] Inventors: Larry D. Frederick; Richard E. Somers, both of Huntsville, Ala.

[73] Assignee: Solar Unlimited, Inc., Huntsville, Ala.

[21] Appl. No.: 181,309

[22] Filed: Aug. 25, 1980

[51] Int. Cl.³ .................. F28D 1/06; F28D 15/00
[52] U.S. Cl. .................. 165/10; 126/400; 165/74; 165/76; 165/104.32; 165/135; 220/4 F
[58] Field of Search .............. 165/76, 74, 135, 136, 165/10, 46, 104.19, 104.32; 126/400; 220/4 F

[56] References Cited

U.S. PATENT DOCUMENTS

| | | | |
|---|---|---|---|
| 3,007,597 | 11/1961 | Morrison | 220/4 F |
| 3,057,603 | 10/1962 | Isreeli | 165/74 |
| 3,093,259 | 6/1963 | Morrison | 220/4 F |
| 3,316,460 | 4/1967 | Scoville | 220/4 F |
| 3,438,069 | 4/1969 | Long | 165/76 X |
| 3,477,606 | 11/1969 | Schwendtner | |
| 3,760,970 | 9/1973 | Lutz | 220/4 F |
| 3,827,135 | 8/1974 | Yamamoto | |

FOREIGN PATENT DOCUMENTS

| | | | |
|---|---|---|---|
| 1465247 | 5/1969 | Fed. Rep. of Germany | 220/4 F |
| 62823 | 6/1955 | France | 220/4 F |

Primary Examiner—Sheldon J. Richter
Attorney, Agent, or Firm—Dowell & Dowell

[57] ABSTRACT

A knock-down tank for containing a liquid medium having a bottom panel, multiple side panels and a top panel secured together by fasteners inside the tank and insulated against heat transfer, the tank being made liquid tight by a plastic liner, and the top panel supporting a depending dip tube assembly whose tubes provide the only access to the liquid contained within the liner.

9 Claims, 6 Drawing Figures

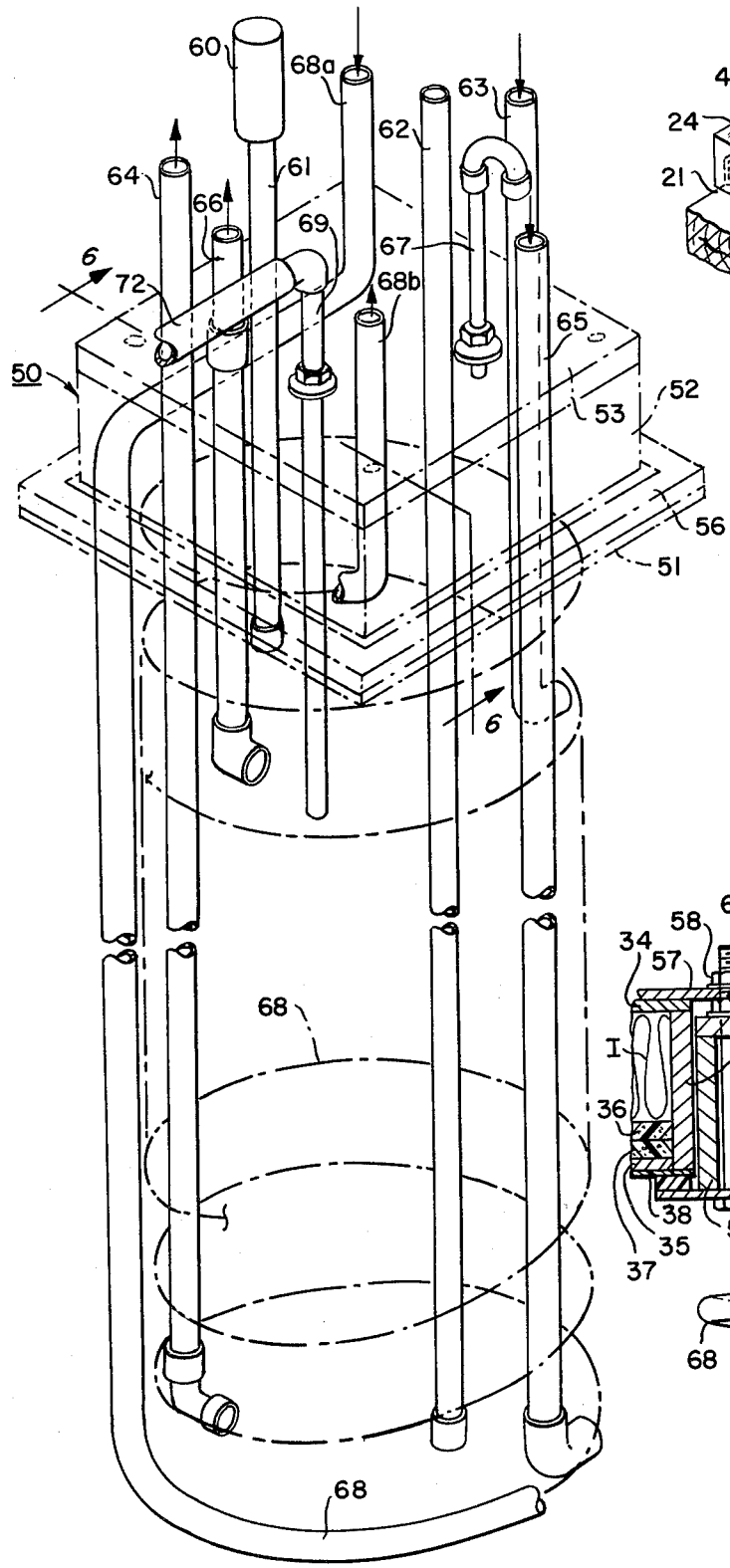
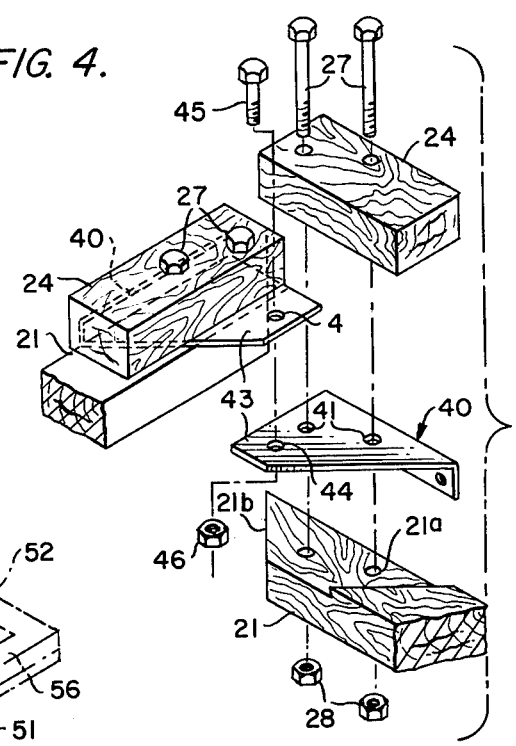
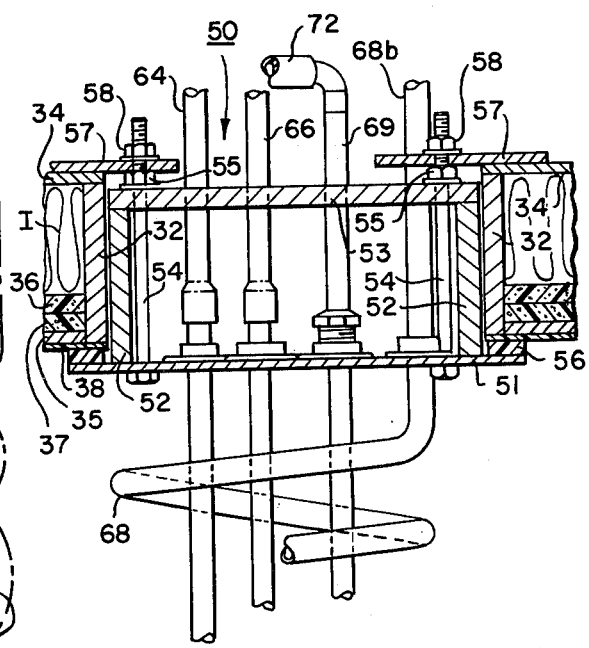

KNOCK-DOWN HEAT STORAGE TANK

BACKGROUND AND PRIOR ART

The increasing use of solar systems to provide space heating and domestic hot water is accompanied by a need for adequate facilities for storing heat obtained from solar collector panels during daylight hours. New buildings can be specially designed to include heat storage facilities such as hot water storage pools, rock-pile storage areas, etc; but a serious problem arises in connection with efforts to install solar heating systems in previously constructed buildings which were not designed with such installations in mind. For instance, access to ground-level or basement rooms of an existing building is generally had through a door or a window of a size which would not admit a large-volume water storage tank. Moreover, once in the building, the installers of the system usually prefer to install the tank against an existing wall, and often in the corner of a room against two adjoining walls, thereby making access to the outside corners of the tank inaccessible for purposes of assembly. Such a tank, besides being of large volume, must be of heavy construction to support the weight of the stored water, and must have thick thermally insulated walls. Moreover, access to the tank which is preferably had through its top portion to preserve optimum leak-proof integrity, may be limited by a low ceiling in the room. The above features are all considered important in the design of a tank having sufficient versatility to permit its assembly in almost all locations where it is to be installed in an existing building.

The prior art shows several knock-down containers which come apart as six panels, which panels have insulated double walls and are mutually secured together by interfitting brackets pinned together on the outside of the container, as taught in U.S. Pat. Nos. 3,007,597 and 3,093,259 issued to Morrison and used to contain and insulate dry or frozen products.

There are also a number of membrane-lined cryogenic containers having frame-constructed side walls as shown in U.S. Pat. No. 3,477,606 to Schwendtner and lined with a membrane liner as shown in U.S. Pat. No. 3,827,135 to Yamamoto, wherein access is gained through the top of the tank. There are, of course, many containers openable by raising a top panel which, when closed, seals by a peripheral gasket to the top edges of the tank walls.

Copies of the above mentioned patents are filed herewith in lieu of a Prior Art Statement.

THE INVENTION

The invention comprises a knock-down tank serving to contain a liquid heat-storage medium and comprising six panels which can be moved in disassembled form through an ordinary size door opening in a building, and subsequently be assembled to form an enclosed rectangular tank having a bottom panel, four side panels, and a top panel. The side panels sit upon the bottom panel, and the side panels are mutually locked together at their side edges by releasable fasteners which are located on the inside of the assembled tank. The tank walls and its bottom support a flexible closely fitting liner having an open top and having peripheral flange portions extending outwardly from the sidewalls of the liner and overlying the upper edges of the side panels of the tank. The top panel of the tank sits on these upper edges and has its lower surface lined with a plastic material similar to the liner which is sealed against the liner by a peripheral gasket. A dip tube assembly placed inside the tank before the top panel is assembled thereto, is pulled upwardly and sealed against the lower surface of the top panel and this assembly carries a number of tubes which dip into the tank for access to the liquid stored therein. The panels are all made as frames enclosed by sheet members and insulated therebetween, and furthermore sheets of heat insulating material are inserted into the tank before the liner is installed therein to pad the liner and keep it away from the walls and from the fastener means located therein. A typical dip tube assembly supports a heat exchanger coil, inlet and outlet tubes dipping into the liquid in the tank, upper and lower temperature measuring tubes, a vent, and a thermostat, and in addition the assembly may include a sight-tube on the outside of the tank for indicating the height of liquid therewithin.

OBJECTS AND ADVANTAGES OF THE INVENTION

It is the principle object of this invention to provide a liquid medium heat-storage tank which will reliably hold the liquid medium without leaks, and which can be disassembled and brought into a building through a normal-size pedestrian access door, and which when assembled will provide excellent insulation against loss of heat from the tank into the living area within the building. Such a tank can have a large capacity for storing heat in water since it can be built with a large volume, the only limitation being that each of the six panels forming the outer rigid shell of the tank must have at least one dimension which can be passed through a normal size seven foot door frame in order to enter the building. The tank has the additional advantage of being stackable when knocked down to form a much smaller flat package for shipment purposes.

Still another major object of the invention is to provide a tank which can be assembled in a restricted or cramped space within a building, and preferably against a wall or in a corner of a room which may have a relatively low ceiling, only a few inches higher than the top of the tank when assembled. The structure of the tank, its liner, its dip tube assembly, and its securing fittings is especially designed to permit the tank to be assembled in a corner of a room under a relatively low ceiling, to avoid the necessity of subsequently having to move the tank in assembled condition. The design of the tank and its parts permits assembly thereof in a definite sequency of steps which results in complete installation of the tank at its final installed position, it being impossible to subsequently move the tank since the assembly procedure calls for partially filling the tank with water immediately after the liner is installed and before the top panel and dip tube assembly of the tank are set in place.

Still another object of the invention is to provide a tank structure wherein the panels are made substantially of wood and fiberglass sheets with porous insulating material between them. It is therefore very important to provide a vapor proof construction which will prevent leaking of liquid vapor into the wooden and insulating components of the tank, which leakage would otherwise cause deterioration of the wood parts as well as decreased insulative integrity of the main panels of the tank.

It is another major object of the invention to provide a liquid medium heat-storage tank having a dip tube assembly wherein all tubes entering and leaving the tank are clustered in a narrow vertical assembly which is installed in the top panel by pulling it upwardly through a hole in the top panel and bolting it in place from the outside of the tank, the tightening of which bolts pulls the dip tube assembly into tightly sealed contact with the lower surface of the top panel to provide a liquid and vapor proof assembly. This construction has the further advantage of permitting the dip tube assembly to be put inside of the tank liner prior to installation of the top panel, and then to be pulled upwardly through the hole in the top panel to seal against its lower internal surface after the top panel is set in place. This permits the assembly to be installed in a low-ceiling room providing only a few inches of clearance above the top of the tank.

Still a further object of the invention is to provide rigid insulating sheets which are placed around the inner surfaces of the side walls and the bottom wall of the tank prior to insertion of the liner, and to provide narrow insulating strips which are shaped to fill the space around and between the side wall fasteners which are located inside the tank, whereby the liner when filled with water and bulged outwardly against these insulating sheets and strips will be fully supported thereby at all locations of the liner, whereby the liner is protected from damage by contact with parts of the tank and fasteners located adjacent to the liner, while at the same time providing additional and improved installation against heat loss through the liner.

It is a further object of this invention to provide a tank of the above character whose outer surfaces can be finished with decorative wall panels designed to match the walls of a room in which it is installed, whereby such a tank need not be disruptive of the decor of the room.

Other objects and advantages of the invention will become apparent during the following discussion of the drawings, wherein.

THE DRAWINGS

FIG. 4 is an exploded detail view shown in perspective and illustrating the fastener means for securing adjacent side wall panels together;

FIG. 5 is an enlarged perspective view illustrating the dip tube assembly with the supporting frame thereof shown in dashed lines to make the tubes themselves clearer; and FIG. 6 is a partial section view of the dip tube assembly taken along line 6—6 of FIG. 5.

DESCRIPTION OF PREFERRED EMBODIMENT

Figure 1:
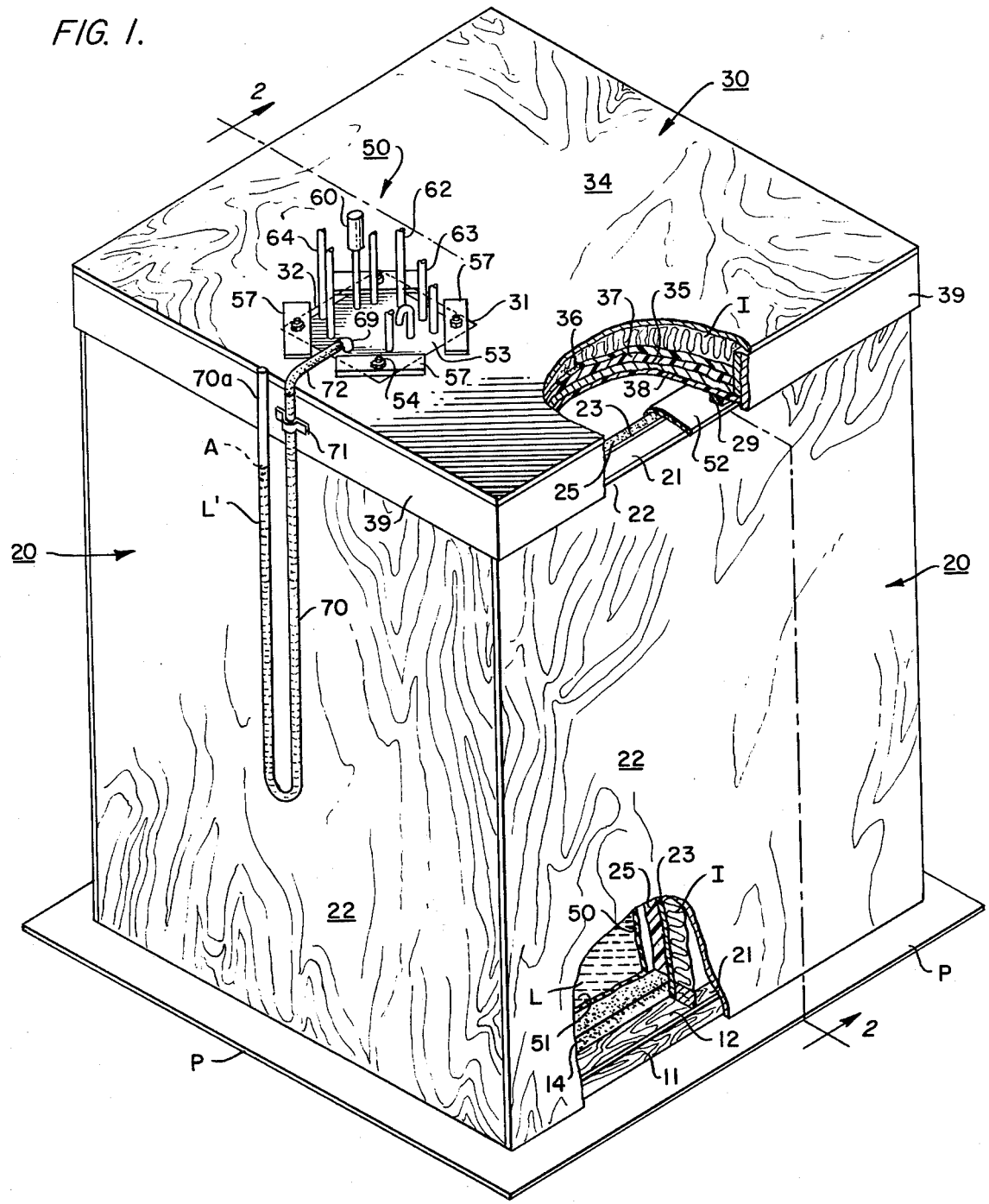
FIG. 1 is a perspective view of a storage tank made according to this invention and showing the tank wall broken away in several locations to show internal structure.
Figure 3:
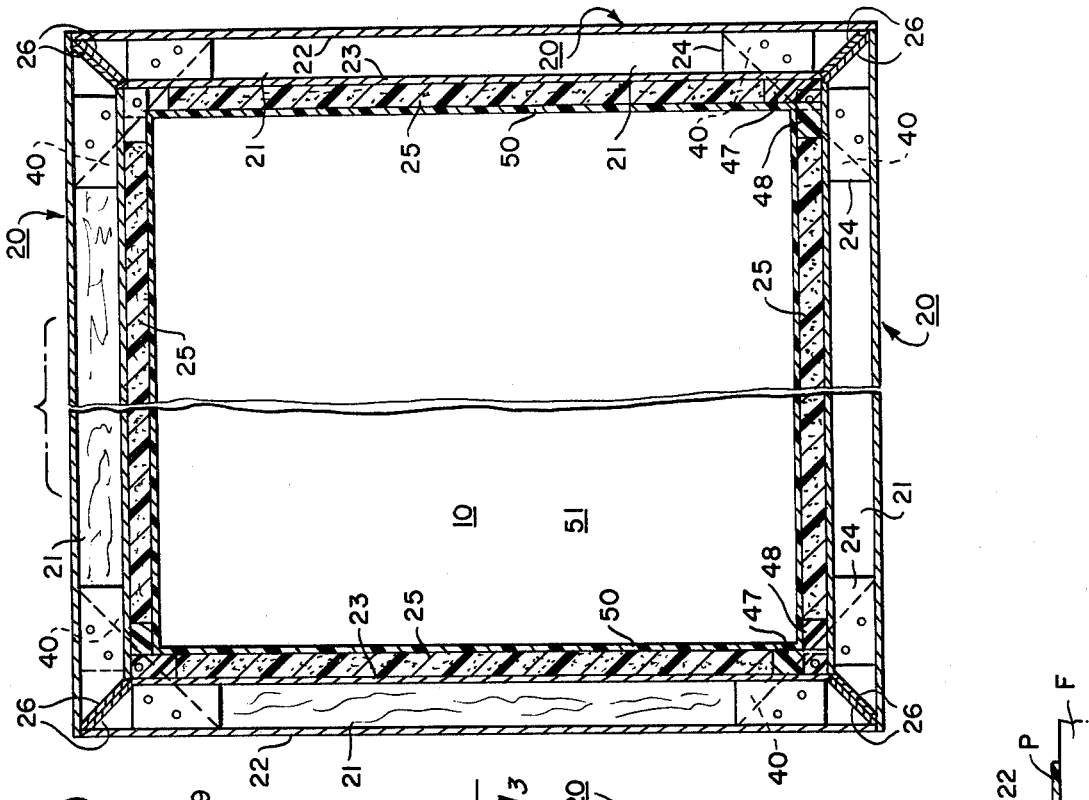
FIG. 3 is a section view taken along line 3—3 of FIG. 2.
Figure 2:
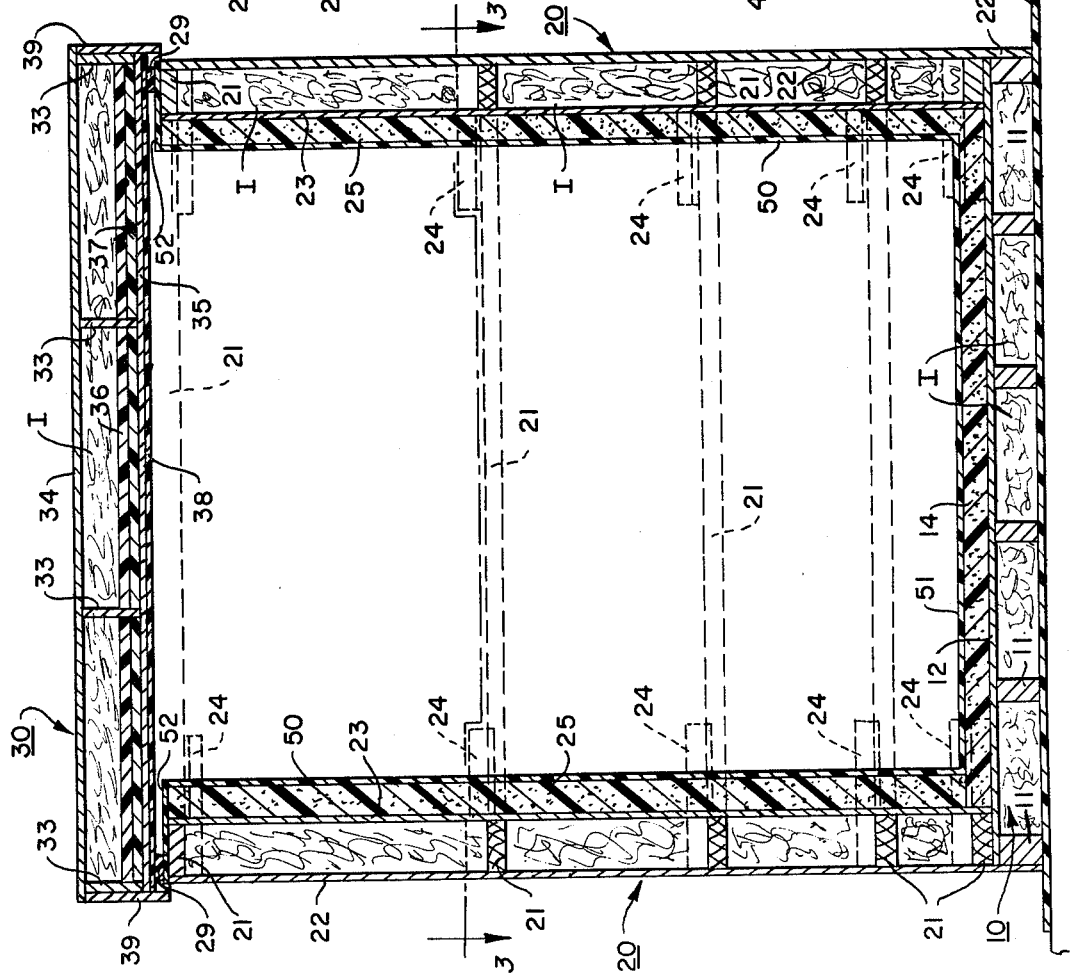
FIG. 2 is a section view taken along line 2—2 of FIG. 1.

Referring now to the drawings, FIGS. 1 and 2 and 3 are views of the tank assembled, showing that the tank includes a bottom panel 10, side panels 20 and a top panel 30 which has a rectangular hole 31 extending downwardly therethrough adapted to receive the dip tube assembly which comprises the subject matter of FIG. 5. As can be seen best in FIG. 2, the bottom panel comprises a series of two-by-four wooden strips labeled 11, and standing on edge to form a frame. The top of the frame is covered by a wooden sheet 12, and the bottom of the frame stands on the floor F of a building over which has been laid a plastic moisture-barrier sheet P. A sheet of rigid heat insulating material 14 overlies the structural sheet 12 which incloses the top surface of the surface of the bottom panel 10.

Each of the four side panels also include a wooden frame made of two-by-four beams 21 which are spaced closer together toward the bottom of the tank because the liquid pressure is greater toward the bottom. The two-by-four frame members are sheathed on the outside by wooden or fiberglass sheets 22, and on the inside by fiberglass sheets 23 which inclosed the frame, the frame being filled with insulation I in the form of glass fiber bats or other suitable material. It is also preferable that the two-by-four frame forming the bottom panel 10 be filled with suitable insulating material I so as to minimize heat losses. As can be seen best in FIG. 2, each two-by-four frame member 21 extends the full horizontal width of the side panel, and is reinforced near its outer end by a shorter two-by-four member 24 which is screwed to it as shown in FIG. 4. The latter figure also shows the manner in which the two-by-four frame member 21 is notched at 21a so as to receive a fastener bracket 40, this feature being further discussed hereinafter. Each side wall also has a rigid sheet of insulating material 25 which is laid over its inner surface sheet 23 for the purpose hereinafter discussed. As can be seen in FIG. 3, each of the two-by-four frame members 21 is beveled at 45° at its extreme ends, and the edges of each panel are inclosed by a diagonal strip of plywood or fiberglass sheeting which is labeled 26, thereby giving the edges of the panel a finished appearance, and also serving to contain the insulating material I within each of the side panels.

The tank is inclosed by a top panel 30 which as can be seen in FIG. 1 has a rectangular hole 31 extending all the way through it. The hole is lined with sheet material comprising either plywood or fiberglass, and the lining is labeled 32 in FIG. 1. A better view of the cross section of the top panel 30 can be seen in FIG. 2 which shows that this top panel also comprises a frame made of one-by-four members 33 which are inclosed on top by a top sheet 34, and inclosed on the bottom by a bottom sheet 35 which also supports suitable insulating sheets 36 and 37 above it. The hollow top panel 30 is also filled with insulating material I. The lower sheet member 35 of the panel 30 is covered with a plastic sheet 38 which is laminated to it and which extends virtually to the edges of the panel, ending in contact with finish strips 39 which inclose the top panel on all four of its sides.

The fastener means by which the side panels 20 are mutually connected together in their corners can best be seen in FIGS. 2, 3 and 4. Each of the side panels 20 comprises 5 horizontal two-by-four frame members 21, spaced apart vertically by different distances as can be seen in FIG. 2. The lower two-by-four members 21 are closer together than the upper ones since they support a greater weight. Each two-by-four frame member 21 is cut off diagonally as at 21b at each end, FIG. 4, and has a clamping block 24 screwed to it which is also a short two-by-four member square at its ends. These blocks are held together by bolts 27 and nuts 28 passing through aligned holes. Between the blocks 24 and the two-by-four frame members 21 are located angle brackets 40 which have holes 41 drilled through them to pass the bolts 27. The angle brackets are wider than the wide dimension of the two-by-four members 21 and the blocks 24 so that an extension 43 of each bracket 40 extends laterally from the two-by-four member 21 as can be seen best in FIG. 4, and each lateral extension 43 has a hole 44 of a size designed to pass a bolt 45 which is held in place by a nut 46. These brackets 40 and bolts 45 comprise the fastening means for the side panels. The bracket on one end of one two-by-four member 21 is sunk into a notch 21a as shown to the right in FIG. 4, whereas the other end of each two-by-four member 21 has no such notch so that at the other end the bracket 40 lies on top of the member 21 and spaces the block 24 from its surface by the thickness of the bracket 40 as shown to the left in FIG. 4. For this reason, when the left end of one two-by-four member 21 approaches the right end of a similar member, on an adjacent panel the brackets 40 which are supported thereon do not abut each other, but instead lap so that one lies beneath the other. Therefore, the bolt 45 can transfix the brackets 40 through their holes 44 and hold the adjacent panels in place in that manner. This overlapping can be seen also in the upper right corner of FIG. 3 of the drawings.

The lateral extensions 43 of the brackets 40, FIG. 4, do not extend as far from the side of the two-by-four members as the thickness of the insulating sheets 25, but the edges of these sheets stop short of the brackets. Therefore, two additional strips of rigid insulating sheet material are provided in each vertical corner, these insulating strips being labeled 47 and 48 in the lower right-hand corner of FIG. 3. Both strips 47 and 48 are the same thickness as the sheets 25, but the strip 47 is twice as wide as the strip 48. When the strips 47 and 48 are fitted into the corners of the tank, oriented vertically, they form continuations of the sheets 25 into those corners. These strips 47 and 48 are notched to receive the lateral extensions 43 of the brackets 40, FIG. 4, and therefore serve to hide these extensions 43 and the bolts 45 and nuts 46 after the brackets have been bolted together.

The insulating strips 47 and 48, and the sheets 25 are fitted together so that they present a continuous rectangular interior surface to a liner 50 which is made of plastic sheet material and which lines the tank on the four sides and on the bottom and serves to contain the water or other heat-storage liquid medium. The liner 50 has 4 sides and a bottom, the bottom being labeled 51 in FIGS. 2 and 3. The liner also has 4 outwardly extending flanges 52 which are most visible in FIGS. 1 and 2. The The liquid within the tank is labeled L as is shown in the bottom right-hand corner of FIG. 1, and also as shown in the sight tube as L' on the left side of FIG. 1, which will be discussed hereinafter. The liner is preferably made of polyvinyl chloride, but can be made of any other suitable plastic material which is flexible and waterproof. The top panel has a gasket 29 which extends all the way around it and is compressed between the plastic sheet 38 on the lower inside surface of the top panel 30 and the top of the flange 52 extending from the liner 50 so as to make the tank vapor-tight.

Referring now to FIGS. 5 and 6, these figures show the dip tube assembly, the top of which is visible also in FIG. 1. The dip tube assembly is generally referred to by the reference character 50, and it comprises a metal plate 51 to which the various tubes are attached for support. The plate 51 carries a box-like structure comprising four side walls 52 and a top wall 53 through which the various tubes extend upwardly out of the storage tank. The top plate 53 and the bottom plate 52 are secured together by a series of elongated bolts 54, one bolt appearing in each corner, and the bolts being tightened against the top plate 53 by nuts 55. The bolts extend above the top plate for the purpose hereinafter discussed.

The box-like structure including the plates 51, 52 and 53 is fitted into the rectangular hole 31 in the upper panel 30 of the tank, FIG. 1, and sealed by an annular gasket 56 which extends all the way around the periphery of the lower plate 51. The boxlike structure is drawn tightly upwardly against the bottom surface of the upper panel 30 so that the gasket 56 is compressed against the plastic sheet 38. This is accomplished by using 4 metal strips 57, which can be seen best in FIGS. 1 and 6, each metal strip 57 having a central hole therethrough which receives the upper end of a bolt 54 and is secured by a nut 58. Obviously, as the nuts 58 are tightened the bolts 54 pull the lower plate 51 upwardly and compress the gasket 56, the bolts 54 and the strips 58 comprising the sole means for holding the dip tube assembly 50 within the hole 31 in the upper panel 30 of the storage tank.

FIG. 5 provides the best showing of the various tubes which are supported by the lower plate 51 and the upper plate 53. These tubes serve the following functions.

The tube 61 carries an aquastat at its lower end and extends only shallowly into the liquid medium L within the tank, whereby the aquastat 60 is responsive to the temperature at the top of the liquid medium L. The tube 62 carries another sensor at its lower end and extends deeply into the liquid medium L for measuring the bottom temperature of the liquid in the tank, the upper and lower temperatures of the water being used by an electrical circuit, which forms no part of the present invention, to control external pumping systems in response to the differential temperature between the upper and lower measurements made at these tubes.

The tubes 63 and 64 respectively comprise the delivery system for heated liquid from a solar collector system (not shown) to the tank. The heated liquid is inserted near the upper end of the tank and the cooler liquid is withdrawn from the lower portion of the tank, forming a circulation system which is in circuit with a heat exchanger (not shown) which comprises a part of the solar collector system to which the storage tank is typically connected.

The tubes 65 and 66 connect with a user circuit (not shown) which may be the heating circuit within a building, or a hot water heater. These tubes serve to directly circulate the heated liquid L from the storage tank to an external unit which uses the heat, such unit forming no part of the present invention. Note that the hottest water at the top of the tank is withdrawn through the tube 66 to go to the heating system whereas the return water, deprived of some of its heat, is subsequently returned from the external user circuit to the storage tank by way of the tube 65 which delivers this cooler water to the bottom of the tank.

The tube 67 is a short tube which barely extends into the top of the storage tank and serves as a breather to equalize the air pressure within the tank above the liquid medium with ambient air pressure outside the tank.

The tube ends 68a and 68b comprise the same tube, and this tube is wound as a heat exchanger coil which is generally labeled 68 in FIGS. 5 and 6. The convolutions of the tube 68 extend around the other tubes through a large number of turns so as to form a heat exchanger coil which is immersed in the liquid medium L. The end 68a of the tube 68 receives a circulating liquid which passes through the coil 68 and departs therefrom through the tube 68b at the top of the assembly 50. This coil 68 is used for heat-exchange connection to still another user (not shown) of the heat stored in the tank, a typical use being to warm the water in a swimming pool. In connection with such use the swimming pool water would be entered into the coil 68 via the tube 68a and would depart from the coil 68 via the tube 68b.

Finally, in order to make it easy to monitor the depth of the liquid medium L in the tank at any time, a U-tube 70 is secured to the side of the tank by a bracket 71, and this tube is connected by a hose 72 to the top of the tube 69. The tube 69 dips below the surface of the liquid medium L in the tank. The U-tube 70 is put into operation by drawing a vacuum on the top of the tube at 70a sufficient to fill the tube 70 with the liquid medium, leaving no air within the tube. Subsequently, when the vacuum at 70a is released, the liquid L' stabilizes at a level A within the U-tube which is identical with the level of the liquid L within the main tank. Thereafter, the level in the tank can be monitored visually merely by looking at the U-tube 70.

SEQUENCE OF ASSEMBLY

The storage tank is shipped in knock-down condition with the various panels 10, 20 and 30 stacked upon eachother, the shipment further including a package of hardware, the dip tube assembly 50, and the insulating strips 47 and 48 which are used to fill out the corners of the tank where the panels are joined to protect the liner 50 from contact with the fasteners 40. The knock-down tank panels are brought into the building, and the plastic sheet P is laid down at the final location of the tank. The bottom panel is then laid on top of the sheet, and the four side panels 20 are erected one-by-one so that their lower peripheries rest upon the lower panel 10 and enclose it. Three of the upright wall panels 20 can be assembled by joining fasteners 40 at two of the corners internally of the tank. A person aligns the holes 44 in the fastener brackets 40 in the corners of 3 of the panels and bolts them together using bolts 45 and nuts 46 as shown in FIGS. 3 and 4.

The fourth panel 20 is then put in place and a person who has climed inside the tank completes its assembly by bolting its fastener brackets 40 to the fastener brackets of two adjacent side panels 20 which are already in place. The person who is still inside the tank then completes the inner surface of the tank by fitting insulating strips 47 and 48 in the respective corners of the tank to fill out the corners as shown in FIG. 3 for the purpose of keeping the liner 50 away from the fasteners 40 which might otherwise puncture the liner. The strips 47 and 48 are notched at the location of each pair of brackets 40 so as to provide clearance for the portions 43 of the brackets and for the bolts 45 and nuts 46 which extend beyond the two-by-four members 21 inwardly of the tank.

The person within the tank then climbs out of the tank, and the liner is inserted into the tank with its peripheral flange portions 52 overlying the top edges of the side panels 20 in the manner shown near the top of FIG. 1, and also visible near the top of FIG. 2. The liner is very carefully fitted so that it lies precisely against the insulating sheets 14, 25, 47 and 48, and the liner is then filled partway with water so as to hold the liner tightly in place during subsequent assembly of the top units in the tank.

Next, the entire dip tube assembly is placed inside the tank and allowed to lie diagonally thereacross, partially submerged in the water. The top panel 30 is then put in place leaving enough upward tilt near the front of the tank so that a person can reach in and grasp the dip tube assembly and insert it upwardly through the hole 31 into the position shown in FIGS. 1, 5 and 6. The strips 57 are then placed over the bolts 54 and the nuts 58 are tightened downwardly against the strips 57 so as to pull the dip tube assembly upwardly in the hole 31 and compress the gasket 56 between the periphery of the lower plate 51 and the plastic lining 38 across the lower surface of the top panel 30. Finally, the U-tube assembly 70 is screwed in place using a bracket 71, and the elastic tube 72 is connected with the dip tube 69 as shown in FIGS. 1, 5 and 6. The remaining tubes are then connected to their external liquid circuits as may be appropriate in a particular tank installation. The weight of the top panel 30 and the dip tube assembly 50 depending therefrom compresses the gasket 29 between the plastic sheet 38 on the lower surface of the top panel 30 and the top flange 52 of the liner 50.

The particular selection of tubes passing through the dip tube assembly plates 53 and 51 can be varied according to the needs of a particular installation. The present invention is not to be limited to the exact form shown in the drawings, for changes can be made within the scope of the following claims.

We claim:

1. A knock-down tank for containing a liquid medium, comprising:

a disassemblable rigid container having a bottom panel, with an inner wall, separate upright sidewall panels having inner walls and upper edges and having lower edges which rest on the bottom panel and having side edges in mutually abutting relationship, and having a top panel overlying said upper edges and closing the container, and having releasable fastener means extending inwardly of the container from the side-wall panels in the vicinity of their abutting side edges and releasably coupled together inside the container to hold the side panels together, the top panel having a hole extending downwardly therethrough;

rigid sheets of heat insulating material disposed against the inner walls of the bottom and side panels and having sufficient thickness to cover and conceal said releasable fastener means which extend inwardly of the container;

a liquid-containing flexible liner having side walls fitting snuggly within said side panels and having a bottom wall supported by said bottom panel, the walls of the liner lying against said sheets of insulating material and having peripheral flange portions extending outwardly from said side walls and overlying the upper edges of said side panels beneath said top panel; and a dip tube assembly extending downwardly into the liner through the hole in the top panel and supported by the top panel the dip tube assembly providing access to the liquid in the liner.

2. A tank as claimed in claim 1, wherein each panel comprises a frame including multiple reinforcing beams, the frame being enclosed by inner and outer sheet members; and said fastener means comprising metal brackets fixed to the beams adjacent to the side edges of each side panel, the brackets of each side panel overlapping the brackets of adjacent side panels, and pin means transfixing the overlapping brackets.

3. A tank as claimed in claim 2, wherein the liquid medium in the tank serves to store heat from an external heat source, the panels being filled with thermal insulating material within their frames.

4. A tank as claimed in claim 2, wherein the liner is made of flexible plastic sheet, and the lower surface of the top panel comprises a plastic sheet, whereby the top panel rests upon said side panels and liner flanges and encloses the open top of the liner, and peripheral gasket means interposed between the top panel and the liner flanges.

5. A tank as claimed in claim 2, wherein the top panel has a hole therethrough, and said dip tube assembly comprises multiple tubes extending vertically through and sealed to a plate of larger dimensions than said hole, the plate having a gasket around the periphery of its upper surface, the plate normally lying against and sealing to the lower surface of the top panel, and means for tightening the plate upwardly against the panel for compressing its gasket against the panel.

6. A tank as claimed in claim 5, wherein the liquid medium in the tank serves to store heat from a source of heat also containing a liquid medium, and to distribute liquid medium to a system using said heat, and said dip tube assembly including "in" and "out" distribution tube means and "in" and "out" storage tube means, the tube means extending through the top panel and said plate and into said liquid medium.

7. A tank as claimed in claim 6, wherein at least one of said "in" and "out" tube means comprises a continuous heater-exchanger coil immersed in the liquid medium in the tank liner.

8. A tank as claimed in claim 6, wherein the dip tube assembly further includes a vent tube to vent the top of the container to the atmosphere, and liquid temperature determining tube means.

9. A tank as claimed in claim 8, wherein said temperature determining tube means includes an aquastat.

* * * * *